(12) United States Patent
Pahl et al.

(10) Patent No.: US 11,990,766 B2
(45) Date of Patent: May 21, 2024

(54) WIRELESS POWER TRANSFER APPARATUS WITH RADIALLY ARRAYED MAGNETIC STRUCTURES

(71) Applicant: Eaton Intelligent Power Limited, Dublin (IE)

(72) Inventors: Birger Pahl, Milwaukee, WI (US); Zelin Xu, San Jose, CA (US); Gerson Nojima, Menomonee Falls, WI (US); Zhichao Wu, Middleton, WI (US); Guangqi Zhu, Wauwatosa, WI (US)

(73) Assignee: Eaton Intelligent Power Limited, Dublin (IE)

( * ) Notice: Subject to any disclaimer, the term of this patent is extended or adjusted under 35 U.S.C. 154(b) by 539 days.

(21) Appl. No.: 16/915,511

(22) Filed: Jun. 29, 2020

(65) Prior Publication Data

US 2021/0006095 A1 Jan. 7, 2021

Related U.S. Application Data

(60) Provisional application No. 62/869,744, filed on Jul. 2, 2019.

(51) Int. Cl.
*H01F 27/06* (2006.01)
*H01F 27/24* (2006.01)
(Continued)

(52) U.S. Cl.
CPC .............. *H02J 50/12* (2016.02); *H01F 27/06* (2013.01); *H01F 27/24* (2013.01); *H01F 27/266* (2013.01); *H01F 27/28* (2013.01); *H01F 27/2871* (2013.01)

(58) Field of Classification Search
CPC .......... H02J 50/12; H02J 50/005; H02J 50/70; H01F 27/06; H01F 27/24; H01F 27/266;
(Continued)

(56) References Cited

U.S. PATENT DOCUMENTS 2,568,169 A 9/1951 Raczynski
3,484,727 A 12/1969 Weber et al.
(Continued)

FOREIGN PATENT DOCUMENTS

CN 102 360 870 A 2/2012
CN 202309183 U 7/2012
(Continued)

OTHER PUBLICATIONS

Braun Toothbrush Teardown, Published on May 29, 2012, EEVblog #284, Retrieved from the internet at URL https://www.youtube.com/watch?v=JJgKfTW53uo.
(Continued)

*Primary Examiner* — Tuyen T Nguyen
(74) *Attorney, Agent, or Firm* — Stanek Lemon Crouse & Meeks, P.A.

(57) ABSTRACT

An apparatus includes a first coil, a second coil having a first side facing a first side of the first coil, a first radial array of magnetic material bodies disposed on a second side of the first coil, and a second radial array of magnetic material bodies disposed on a second side of the second coil such that respective magnetic material bodies of the second radial array overlap respective magnetic material bodies of the first radial array. The apparatus may be included in a wireless power transfer system.

19 Claims, 12 Drawing Sheets

(51) Int. Cl.
*H01F 27/26* (2006.01)
*H01F 27/28* (2006.01)
*H02J 50/12* (2016.01)

(58) Field of Classification Search
CPC .... H01F 27/28; H01F 27/2871; H01F 27/325; H01F 38/14
See application file for complete search history.

(56) References Cited

U.S. PATENT DOCUMENTS

| | | | |
|---|---|---|---|
| 4,471,335 | A | 9/1984 | Moritz et al. |
| 4,800,328 | A | 1/1989 | Bolger |
| 4,985,922 | A | 1/1991 | Kolbert |
| 5,325,046 | A | 6/1994 | Young et al. |
| 5,477,122 | A | 12/1995 | Hall et al. |
| 5,923,152 | A | 7/1999 | Guerrera |
| 6,060,875 | A | 5/2000 | Capici et al. |
| 6,198,375 | B1 | 3/2001 | Shafer |
| 6,957,351 | B2 | 10/2005 | Emberty et al. |
| 6,967,553 | B2 | 11/2005 | Jitaru |
| 7,411,479 | B2 | 8/2008 | Baarman et al. |
| 7,495,414 | B2 | 2/2009 | Hui |
| 7,554,430 | B2 | 6/2009 | Mehrotra et al. |
| 7,639,110 | B2 | 12/2009 | Baarman et al. |
| 8,089,766 | B2 | 1/2012 | Attlesey |
| 8,138,875 | B2 | 3/2012 | Baarman et al. |
| 8,380,998 | B2 | 2/2013 | Azancot et al. |
| 8,531,059 | B2 | 9/2013 | Ichikawa et al. |
| 8,669,678 | B2 | 3/2014 | Urano |
| 8,692,639 | B2 | 4/2014 | Baarman et al. |
| 8,698,350 | B2 | 4/2014 | Kanno |
| 8,742,625 | B2 | 6/2014 | Baarman |
| 9,006,935 | B2 | 4/2015 | Fukushima |
| 9,257,851 | B2 | 2/2016 | Baarman |
| 9,590,525 | B2 | 3/2017 | Nirantare et al. |
| 9,705,567 | B2 | 7/2017 | Dean |
| 9,859,594 | B2 | 1/2018 | Miller et al. |
| 9,984,815 | B2 | 5/2018 | Xu et al. |
| 10,038,324 | B2 | 7/2018 | Nirantare et al. |
| 10,116,230 | B2 | 10/2018 | Wu, Jr. et al. |
| 2003/0201860 | A1 | 10/2003 | Yang |
| 2006/0049907 | A1 | 3/2006 | Liu |
| 2007/0007935 | A1 | 1/2007 | Johnson |
| 2008/0122543 | A1 | 5/2008 | Silver |
| 2008/0204116 | A1 | 8/2008 | James |
| 2008/0265684 | A1 | 10/2008 | Farkas |
| 2010/0148723 | A1 | 6/2010 | Cook |
| 2010/0314946 | A1 | 12/2010 | Budde |
| 2010/0314947 | A1 | 12/2010 | Baarman et al. |
| 2011/0049997 | A1 | 3/2011 | Urano |
| 2011/0080053 | A1 | 4/2011 | Urano |
| 2011/0127845 | A1 | 6/2011 | Walley et al. |
| 2011/0127846 | A1 | 6/2011 | Urano |
| 2011/0163542 | A1 | 7/2011 | Farkas |
| 2011/0304216 | A1 | 12/2011 | Baarman |
| 2012/0043825 | A1 | 2/2012 | Urano |
| 2012/0049647 | A1 | 3/2012 | Kim |
| 2012/0086281 | A1 | 4/2012 | Kanno |
| 2012/0112719 | A1 | 5/2012 | Xia et al. |
| 2012/0193993 | A1 | 8/2012 | Azancot et al. |
| 2012/0200989 | A1 | 8/2012 | Byrne et al. |
| 2012/0212068 | A1 | 8/2012 | Urano |
| 2012/0280575 | A1 | 11/2012 | Kim et al. |
| 2012/0293118 | A1 | 11/2012 | Kim et al. |
| 2012/0294045 | A1 | 11/2012 | Fornage et al. |
| 2013/0033117 | A1 | 2/2013 | Kim et al. |
| 2013/0154382 | A1 | 6/2013 | Kurata |
| 2013/0187625 | A1 | 7/2013 | Mao |
| 2013/0249304 | A1 | 9/2013 | Keeling et al. |
| 2013/0249479 | A1 | 9/2013 | Partovi |
| 2013/0300204 | A1 | 11/2013 | Partovi |
| 2013/0328410 | A1 | 12/2013 | Georgakopoulos |
| 2014/0035520 | A1 | 2/2014 | Nakamura |
| 2014/0049118 | A1 | 2/2014 | Karalis et al. |
| 2014/0103730 | A1 | 4/2014 | Irie |
| 2014/0125142 | A1 | 5/2014 | Kanno |
| 2014/0183967 | A1 | 7/2014 | Ryu et al. |
| 2014/0203657 | A1 | 7/2014 | Song et al. |
| 2014/0265613 | A1 | 9/2014 | Jaskolski |
| 2014/0361628 | A1 | 12/2014 | Huang |
| 2015/0091389 | A1 | 4/2015 | Byrne et al. |
| 2015/0091522 | A1 | 4/2015 | Byrne et al. |
| 2015/0188446 | A1 | 7/2015 | Wu et al. |
| 2015/0280455 | A1 | 10/2015 | Bosshard et al. |
| 2016/0001662 | A1 | 1/2016 | Miller et al. |
| 2016/0006356 | A1 | 1/2016 | Nirantare |
| 2016/0181821 | A1 | 6/2016 | Xu et al. |
| 2016/0344195 | A1* | 11/2016 | Xu .......................... H01F 27/36 |

FOREIGN PATENT DOCUMENTS

| | | | |
|---|---|---|---|
| CN | 202444333 U | 9/2012 | |
| CN | 108933029 | 12/2018 | |
| EP | 2 450 921 A1 | 5/2012 | |
| EP | 2 458 600 A1 | 5/2012 | |
| EP | 2 868 492 A1 | 5/2015 | |
| FR | 2775383 | 8/1999 | |
| GB | 1134208 | 2/1966 | |
| JP | 2006-271027 A | 10/2006 | |
| WO | WO 02/25677 A2 | 3/2002 | |
| WO | WO 2012/046453 A1 | 4/2012 | |
| WO | WO 2013/009276 A1 | 1/2013 | |
| WO | WO 2013/111243 A1 | 8/2013 | |
| WO | WO 2013124359 A2 | 8/2013 | |
| WO | WO-2013142720 A1 * | 9/2013 | ............... B60L 1/02 |
| WO | WO 2014/122121 A1 | 8/2014 | |

OTHER PUBLICATIONS

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

International Preliminary Report on Patentability Corresponding to International Application No. PCT/US2014/072667; dated Jul. 14, 2016; 7 Pages.

International Search Report and Written Opinion Corresponding to International Application No. PCT/US2014/072667; dated Mar. 25, 2015; 9 Pages.

International Search Report and Written Opinion Corresponding to International Application No. PCT/US2016/047308; dated Nov. 16, 2016; 10 Pages.

International Search Report and Written Opinion Corresponding to International Application No. PCT/IB2015/055004; dated Sep. 15, 2015; 9 Pages.

International Search Report and Written Opinion Corresponding to International Application No. PCT/US2015/066406; dated Mar. 9, 2016; 11 Pages.

International Search Report and Written Opinion Corresponding to International Application No. PCT/US2016/031810; dated Jul. 20, 2016; 12 Pages.

International Search Report and Written Opinion Corresponding to International Application No. PCT/EP2015/080520; dated Jun. 30, 2016; 24 Pages.

Kelly et al. "Plastic-iron-powder distributed-air-gap magnetic material", $21^{st}$ Annual IEEE Power Electronics Specialists Conference, Jun. 1990, pp. 25-34.

Nair et al. "Efficiency Enhanced Magnetic Resonance Wireless Power Transfer System and High Voltage Integrated Chip Power Recovery Scheme", *IEEE CONECCT 2014*, Jan. 6-7, 2014.

Pang, Y.X. et al. (2007) "The influence of the dielectric on the properties of dielectromagnetic soft magnetic composites. Investi- (56) References Cited

OTHER PUBLICATIONS gations with silica and silica hybrid sol-gel derived model dielectric", *Journal of Magnetism and Magnetic Materials*, 310 (1), pp. 83-91.
International Search Report and Written Opinion; PCT/US2020/040626; dated Oct. 9, 2020; 11 pages.

* cited by examiner

WIRELESS POWER TRANSFER APPARATUS WITH RADIALLY ARRAYED MAGNETIC STRUCTURES

CROSS REFERENCE TO RELATED APPLICATIONS

The present application is a non-provisional application claiming priority to U.S. Patent Application No. 62/869,744; filed Jul. 2, 2019, the disclosure of which is hereby incorporated herein by reference in its entirety.

STATEMENT OF GOVERNMENT INTEREST

This invention was made with Government support under Cooperative Agreement DE-AR0000896 awarded by the Department of Energy. The Government has certain rights in this invention.

BACKGROUND

The inventive subject matter relates to wireless power transfer systems and, more particularly, to magnetic components for use in wireless power transfer systems.

Data centers are large energy consumers, estimated to account for almost 2% of US electricity consumption and 10% of the federal government's electricity consumption. Data centers typically consume between 1 MW and 20 MW of power, and some newly constructed centers consume 100 MW or more. Power typically comes in from redundant utility feeds at medium voltage (e.g., 35 kV) and requires several conversion stages before being distributed to a great number of server racks at 208V to 240V AC. The market need for higher power in data centers has forced the trend of higher distribution voltages inside data centers to reduce cable sizes and increase efficiency.

Conventionally, a utility feed provided to a data center at 35 kV is transformed to 480V for distribution inside the building, such as to an uninterruptible power supply (UPS) inside a computer room or server hall. From there, it passes through a power distribution unit (PDU) transformer and converted to 415V three phase, which is the distribution voltage to the rack. At the rack level, server supplies are typically powered by 230V single phase and provide power to the servers at 12V DC. The high current capability of traditional 480V and 415V distribution means that incident energy level for arc flash ratings is very high and personal protection equipment (PPE) ratings for work on such distribution and switchgear is very high. Nearly one third of data center operators have reported doing "hot work" or maintenance on energized equipment—a significant risk to human safety. Accidental human error is a major cause for outages, with estimated cost per outage range from $74,000 to more than $1.7 million.

Several new techniques change distribution voltage inside data centers to simplify distribution. For example, a data center has been built using 380V DC distribution to the rack. For large data centers (above 20 MW), there is a trend to distribute power in the building at medium voltage (e.g., 4160 V), which can significantly reduce the number and sizes of cables. On the IT rack side, data center operators, like those behind the Open Compute Project, have proposed increasing the server supply voltage from 12 VDC to 48 VDC. Future servers are expected to use 48 VDC and employ point-of-use supplies on the motherboard that generates the various small DC voltages used by the processor, communications buses, etc.

SUMMARY

Some embodiments of the inventive subject matter provide an apparatus including a first coil, a second coil having a first side facing a first side of the first coil, a first radial array of magnetic material bodies disposed on a second side of the first coil, and a second radial array of magnetic material bodies disposed on a second side of the second coil such that respective magnetic material bodies of the second radial array overlap respective magnetic material bodies of the first radial array. The apparatus may be included in a wireless power transfer system.

The first coil, the second coil, the first radial array of magnetic material bodies and the second radial array of magnetic material bodies may be coaxially aligned. The magnetic material bodies of the first and second radial arrays may include elongate magnetic material bars, each extending lengthwise from a center of the array towards a periphery of the array.

According to some embodiments, the apparatus may further include a first circular frame that supports the first radial array and a second circular frame that supports the second radial array. The first and second coils may be disposed between the first and second circular frames. The apparatus may further include a separator plate disposed between the first and second coils and first and second bobbins on respective first and second sides of the separator plate. The first and second coils may be wound around respective ones of the first and second bobbins.

According to additional embodiments, the apparatus may further include a first frame that retains the first radial array of magnetic material bodies and the first coil and a second frame that retains the second radial array of magnetic material bodies and the second coil and is attached to the first frame. The first radial array of magnetic material bodies and the first coil may be disposed on a first side of the first frame that faces the second frame, the second coil may be disposed on a first side of the second frame that faces the first frame, and the second radial array of magnetic material bodies may be disposed on a second side of the second frame. The magnetic material bodies may be C-shaped and overlapping ones of the magnetic material bodies from respective ones of the first and second radial arrays may substantially surround portions of the first and second coils. In some embodiments, the first radial array of magnetic material bodies may include a first magnetic material body including a main body section disposed parallel to the first and second coils and first and second end sections that extend perpendicularly from the main body section and the second radial array of magnetic material bodies may include a second magnetic material body including a main section disposed parallel to main body section of the first magnetic material body and first and second end sections that extend perpendicularly from the main body section of the first magnetic material body to towards opposing ones of the first and second end sections of the first magnetic material body such that the first and second magnetic material bodies substantially surround portions of the first and second coils.

Further embodiments provide an apparatus including a first frame, a first radial array of magnetic material bodies retained in the first frame, a second frame, and a second radial array of magnetic material bodies retained in the second frame and coaxially aligned with the first radial array of magnetic material bodies in the first frame such that respective magnetic material bodies of the second radial array overlap respective magnetic material bodies of the first radial array. The apparatus further includes a plate between the first and second frames, a first coil between the first radial array and the plate, and a second coil between the second radial array and the plate. The magnetic material bodies of the first and second radial arrays may include elongate magnetic material bars, each extending lengthwise from a center of the array towards a periphery of the array. The first radial array of magnetic material bodies may be axisymmetric and the second radial array of magnetic material bodies may be axisymmetric.

Still further embodiments provide an apparatus including a first frame, a second frame overlapping and attached to the first frame, a first radial array of magnetic material bodies retained by the first frame and disposed between the first and second frames, a first coil between the first radial array of magnetic material bodies and the second frame, a second coil retained by the second frame on a first side thereof facing the first coil, and a second radial array of magnetic material bodies retained on the second frame on a second side thereof and aligned with the first radial array of magnetic material bodies such that respective magnetic material bodies of the second radial array overlap respective magnetic material bodies of the first radial array. The magnetic material bodies may be C-shaped and overlapping ones of the magnetic material bodies from respective ones of the first and second radial arrays may substantially surround portions of the first and second coils. The first radial array of magnetic material bodies may be axisymmetric and the second radial array of magnetic material bodies may be axisymmetric.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Embodiments of the inventive subject matter described herein generally relate to power supply apparatus and methods that are "wireless," "contactless" or "isolated," which generally refer to systems that provide power transfer across a separating medium (e.g., a dielectric wall or other structure) that provides galvanic isolation between circuit domains, such as between a AC or DC electric distribution system in a data center and a rack-based power supply system that provides power to a server in a data center rack. According to some aspects of the inventive subject matter, wireless power transmission apparatus using a medium input voltage above 1 kV may be used to provide power at a data center rack. Such apparatus can extend the industry trend of safely moving medium voltage close to the application, e.g., nearer the racks of IT servers. Some embodiments may implement medium voltage conversion in a resonant wireless power transfer system, i.e., wireless power conversion with voltage transformation and low voltage rectification at high DC current levels. Some embodiments may provide apparatus, such as transformers, that support such distribution architectures.

Figure 1:
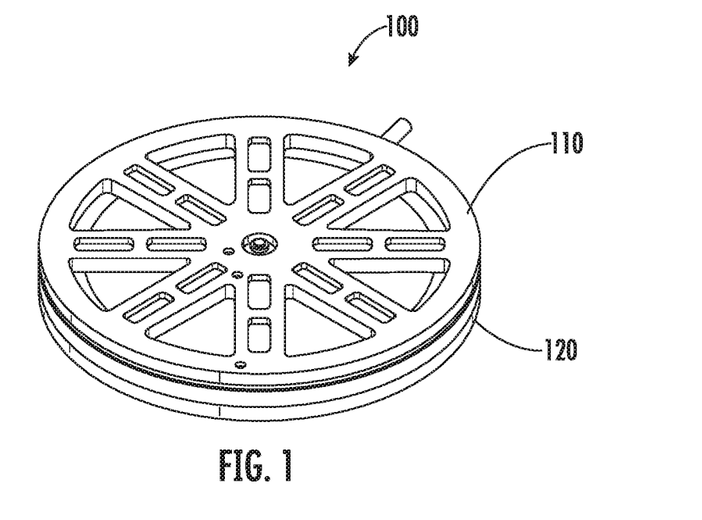
FIG. 1-3 are views of a transformer apparatus and components thereof according to some embodiments.
Figure 2:
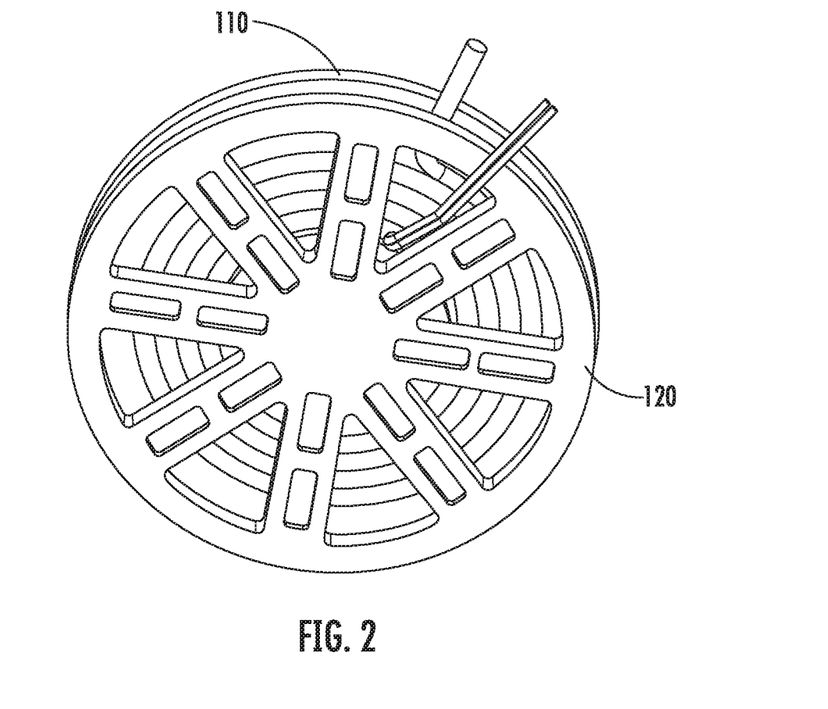
Figure 3:
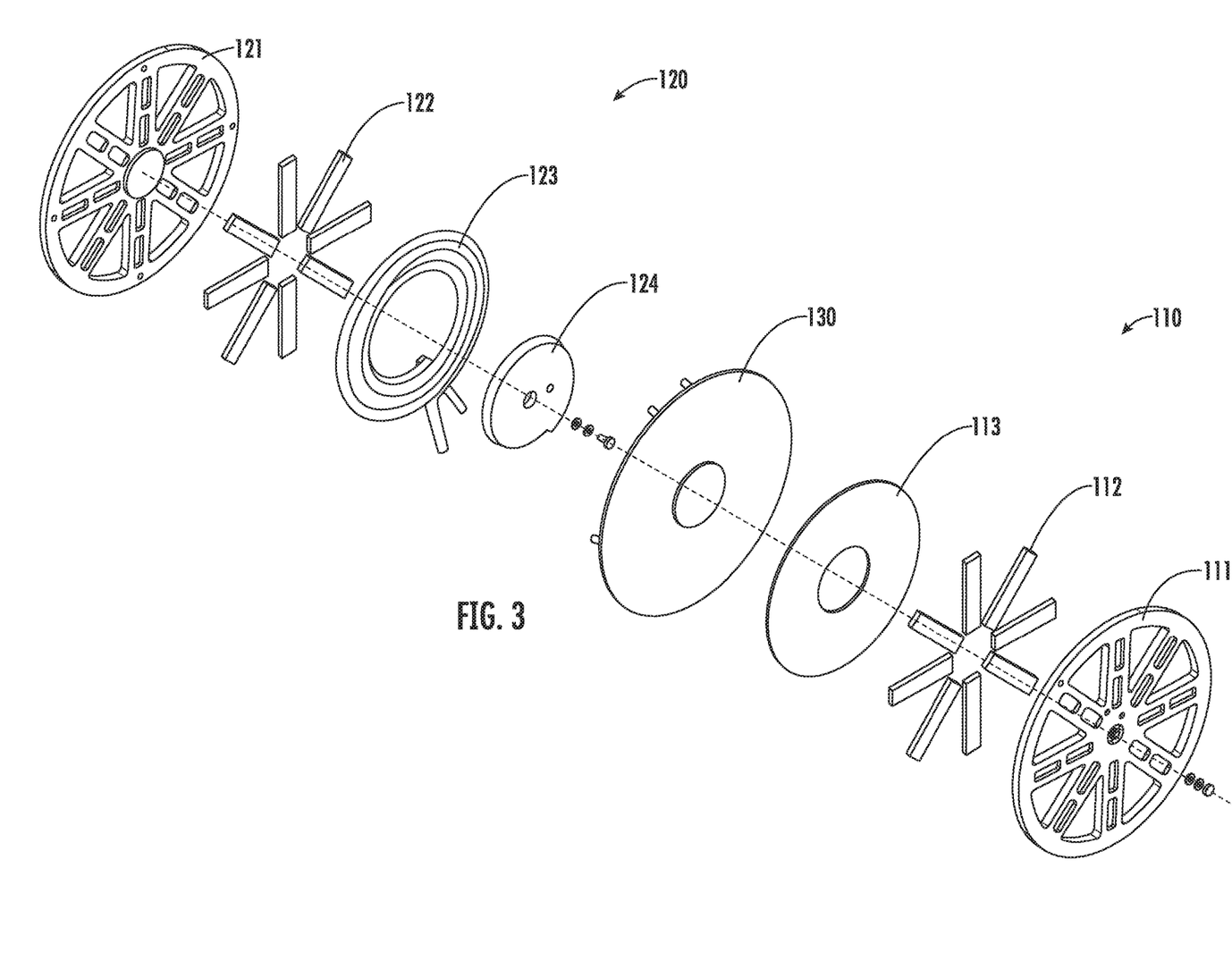

FIGS. 1-3 illustrate a transformer assembly 100 that may be used in such a wireless power transfer application according to some embodiments. Referring to FIGS. 1 and 2, the assembly 100 includes a primary side component 110 and a secondary side component 120 that overlaps the primary side component 110 to provide inductive coupling. The transformer assembly 100 may be used, for example, in a wireless power transfer system, wherein the primary side component 110 is coupled to an inverter of the wireless power transfer system and the secondary side component 120 is coupled to an output rectifier of the wireless power transfer system.

Referring to the exploded view in FIG. 3, the primary side component 110 may include a planar primary coil 113 and a plurality of magnetic material bodies, here shown as magnetic (e.g., ferrite) material bars 112. A first frame 111 holds the magnetic material bars 112 in an axisymmetric arrangement, and the primary coil 113 is disposed between the magnetic material bars 112 and a dielectric separator 130 that separates the primary side component 110 from the secondary side component 120.

The secondary side component 120 includes a planar secondary coil 123 and a second plurality of magnetic material bars 122 held in an axisymmetric arrangement by the second frame 121 and aligned with the axisymmetric array of the first plurality of magnetic material bars 112. The secondary coil 123 is disposed between the second plurality of ferromagnetic bars 112 and the dielectric separator 130, coaxially arranged with respect to the primary coil 113. As further shown, the secondary coil 123 may be wound around a bobbin 124 that is attached to the dielectric separator 130. A similar bobbin may be used for the primary coil 113.

A potential application for such a transformer is in wireless power transfer applications in which a medium voltage (e.g., 4160 V) supply is connected to the primary coil 113 and a relatively low voltage (e.g., 48 V) load is coupled to the secondary coil 123. Because of the relatively high operating voltage of the primary side, the primary coil 113 may be formed from relatively small diameter wire, while the wire used for the secondary coil 113 may have a relatively greater diameter to provide increased current capability arising from the relatively low operating voltage on the secondary side of the transformer 100. The planar coil arrangement enables the provision of a relatively large turns ratio between the primary component 110 and the secondary component 120 of the transformer 100. Generally, the turns ratio required will be a function of the voltage transformation ratio desired and/or the topology of the converters with which the transformer 100 is used. While the primary coil 113 and the secondary coil 123 may be formed using round cross-section wires, other types of wires can be used, such as braided wires, twisted wires, flat wires or wires with rectangular, elliptical, or other cross-sections. For example, either or both of the primary coil 113 and the secondary coil 123 may be fabricated using Litz wire to reduce high frequency losses.

The magnetic bars 112, 122 enhance magnetic coupling between the primary coil 113 and the secondary coil 123 by providing a high-permeability paths to shape magnetic flux. The axisymmetric arrangement of the bars 112, 122 can, for example, reduce magnetic flux leakage outside of the apparatus 100. It will be appreciated, however, that other arrangements of magnetic materials can be used to provide similar functionality.

The dielectric separator 130 is shown as a disk-shaped plate that may be formed of an insulating material, such as a plastic. The thickness and geometry of the separator 130 may be dependent on the desired voltage isolation between the primary component 110 and the secondary component 120. As the separator 130 may also act as a structural support for the other components of the assembly 100, its configuration and thickness may also depend on mechanical requirements for such a support function. The illustrated embodiment shows a separator 130 that is part of an integrated assembly 100 including both a primary component 110 and a secondary component, but it will be understood that other arrangements may be used. For example, in some embodiments, the primary and secondary components 110, 120 may be included in separate assemblies. In some embodiments, the separator 130 may be included in one of these assemblies, while in other embodiments, a separator may be a separate component or part of another assembly, such as a wall of an enclosure or a portion thereof that provides, for example, similar voltage isolation and desirable spacing of the magnetic bars 112, 122 and the coils 113, 123.

Figure 4:
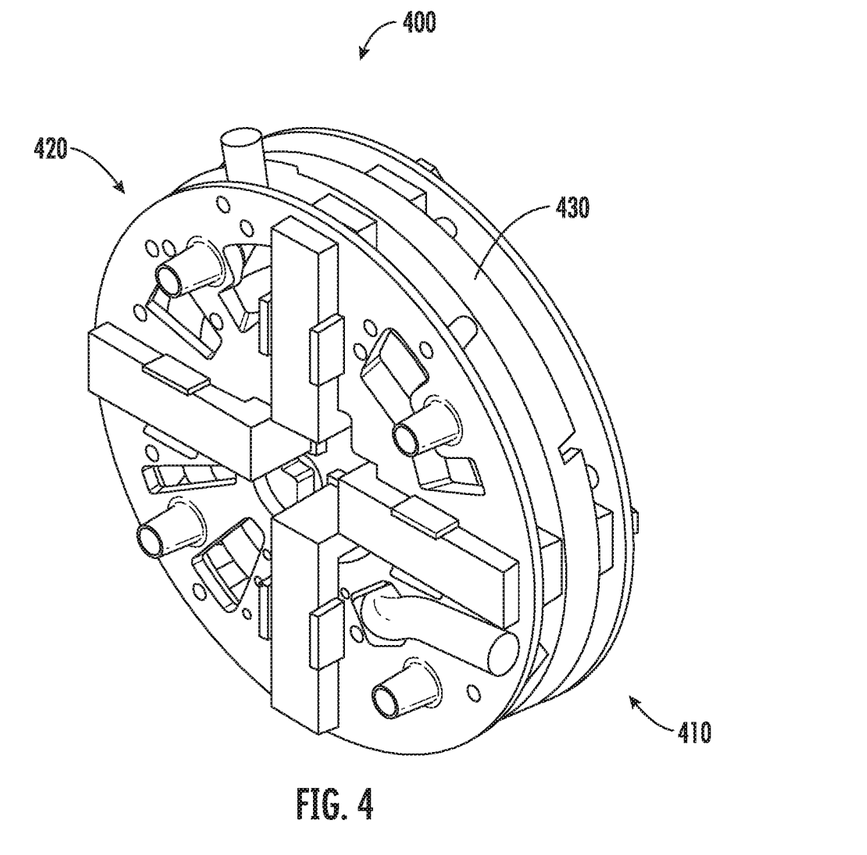
FIGS. 4-18 are views of a transformer apparatus and components thereof according to further embodiments.
Figure 5:
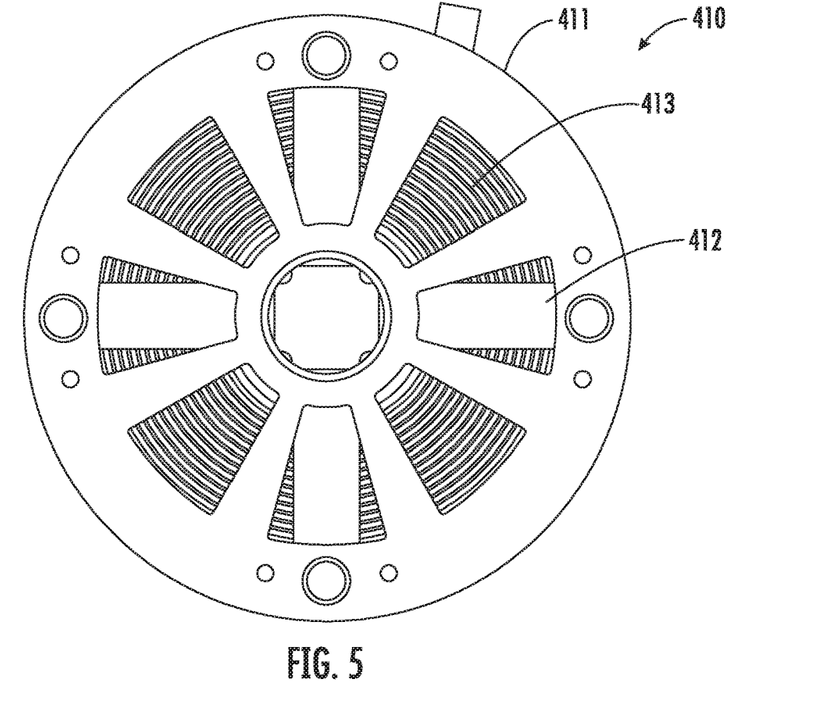
Figure 6:
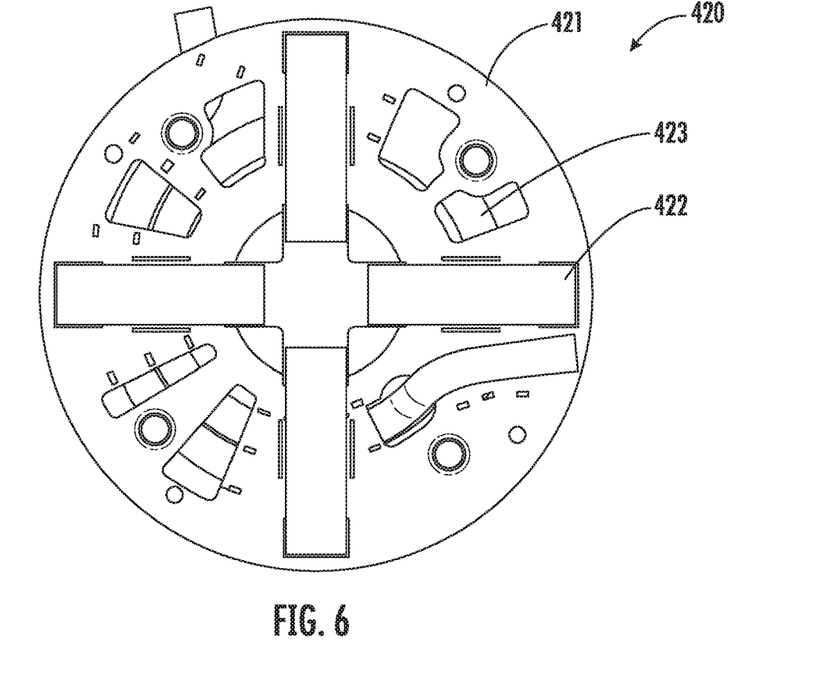
Figure 12:
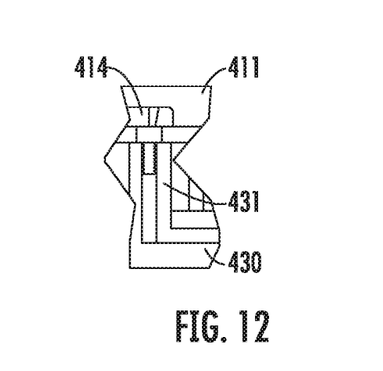
Figure 13:
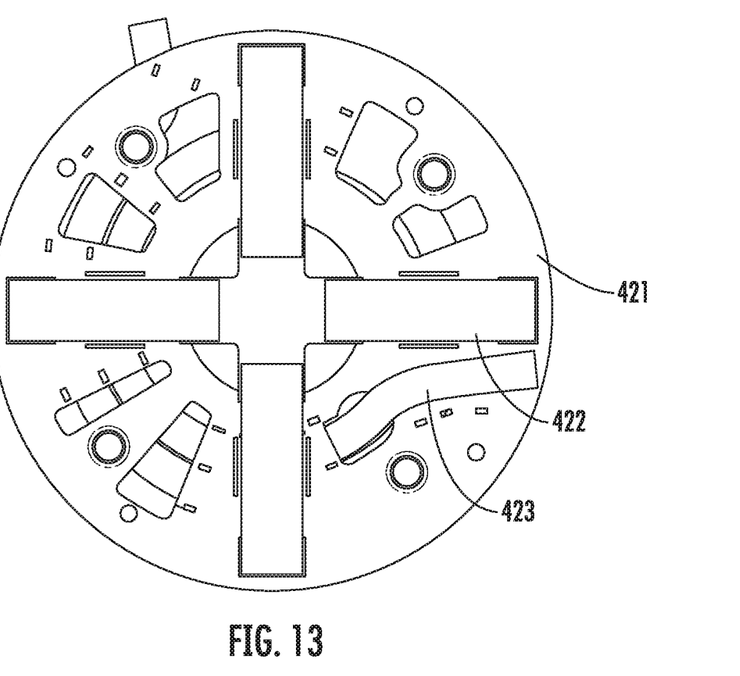
Figure 14:
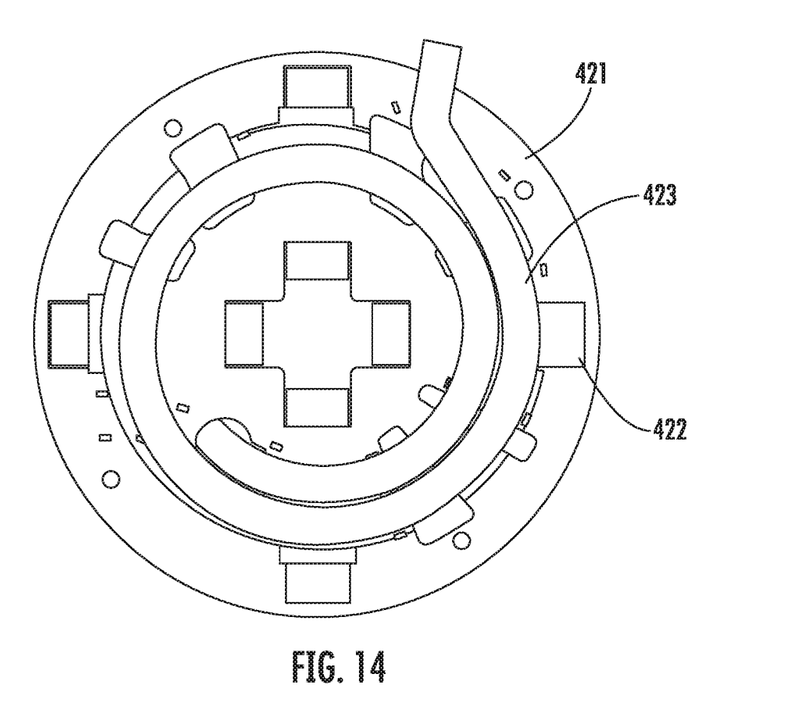

FIGS. 4-18 illustrate a transformer 400 according to further embodiments. Referring to FIG. 4, the transformer 400 includes a primary component 410 and a secondary component 420 that are arranged in an overlapping, coaxial arrangement. Referring to FIGS. 5, 7, 8, 10, 11, 17 and 18, the primary component 410 includes a planar primary coil 413 and C-shaped primary side magnetic material bodies 412 that are arrayed in an axisymmetric arrangement. As shown in FIG. 12, the primary coil 413 and the primary side magnetic material bodies 412 are retained by a first frame 411 that is secured to a second frame 430 by first screws 414 that engage first threaded standoffs 431 of the second frame 430. The first frame 411 and/or the second frame 430 may include grooves, ridges, clips, spools (bobbins) and/or other features that support the primary coil 413 and aid in maintaining a shape that provides desired coupling characteristics. The first frame 411 and/or the second frame 430 may also include grooves, ridges, clips and/or other features for supporting the magnetic material bodies 412.

Figure 15:
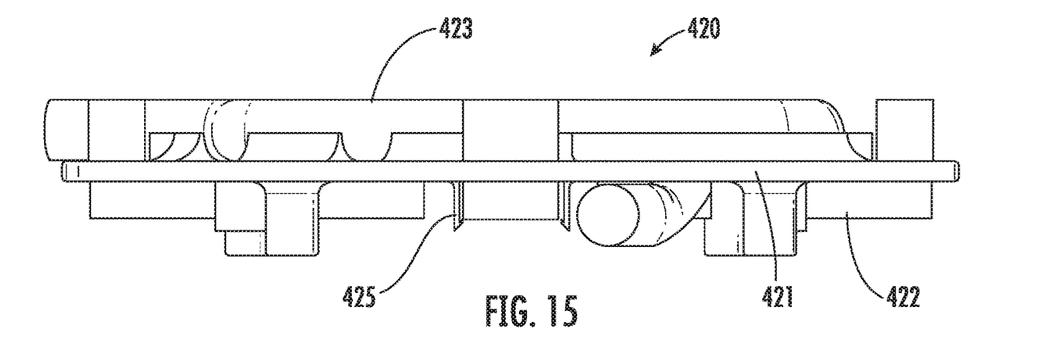
Figure 16:
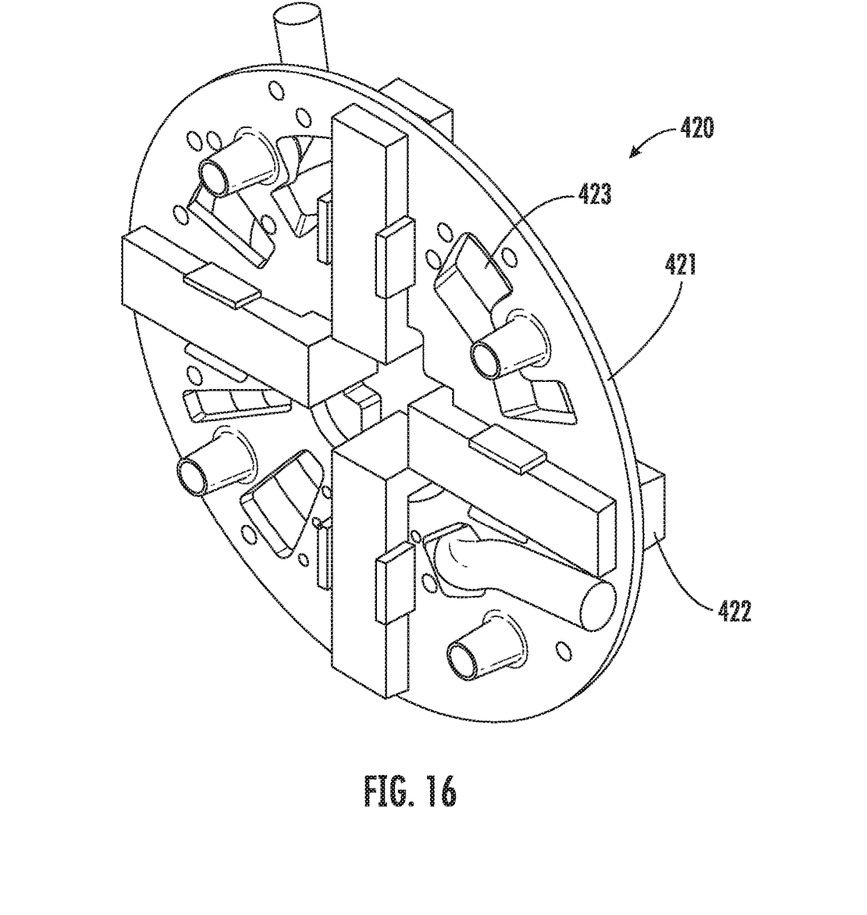
Figure 17:
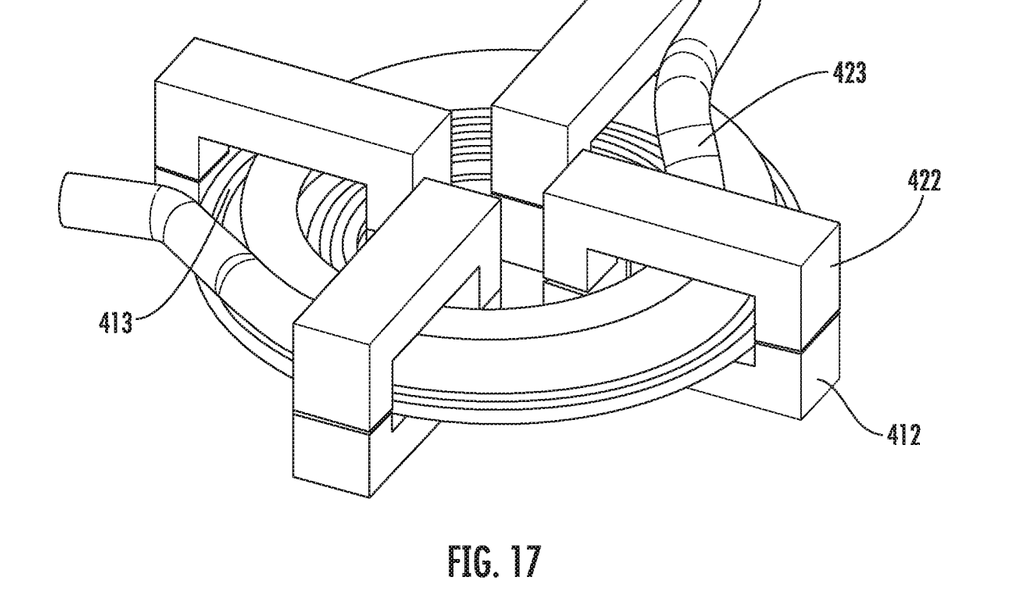
Figure 18:
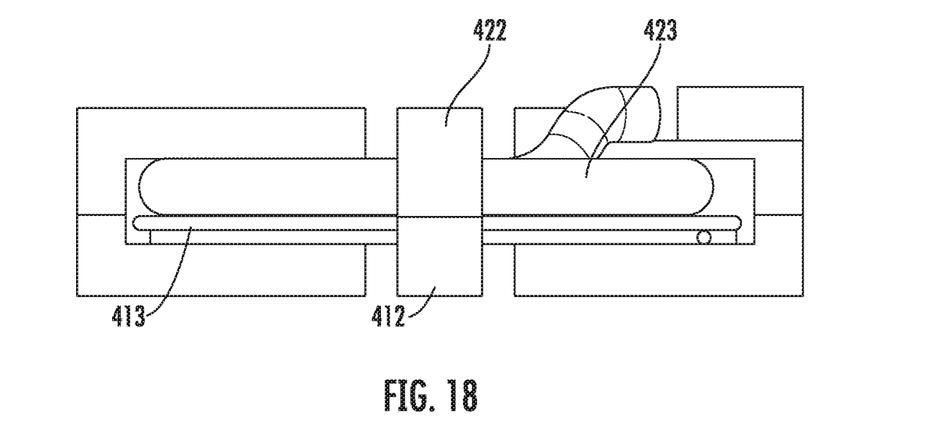

Referring to FIGS. 6-10, and 13-18, the secondary component 420 includes a secondary coil 423 that is arranged coaxially with the primary coil 413 and C-shaped secondary side magnetic material bodies 422 that are arranged in an axisymmetric arrangement and aligned with the primary side magnetic material bodies 412 such that respective pairs of opposing ones of the primary side magnetic material bodies 412 and the secondary side magnetic material bodies 422 form magnetic circuits, as illustrated in FIGS. 17 and 18. Referring to FIG. 15, the secondary side magnetic bodies 422 are retained by clips 425 formed in a third frame 421, which is secured to the second frame 430 by second screws 424 that engage threaded standoffs 432 of the second frame 430. The secondary coil 423 is contained in a space defined between the second frame 430 and the third frame 421. The second frame 430 and/or the third frame 421 may include grooves, ridges, spools (bobbins) and/or other features that support the secondary coil 423 and aid in maintaining a shape that provides desired coupling characteristics. The second frame 430 and/or the third frame 421 also include grooves, ridges, clips and/or other features for supporting the magnetic material bodies 422.

Figure 7:
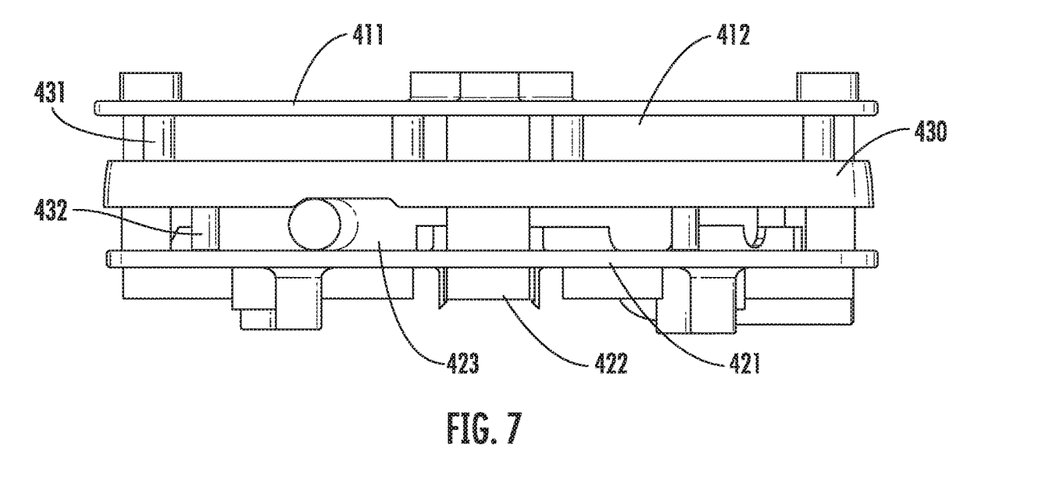
Figure 8:
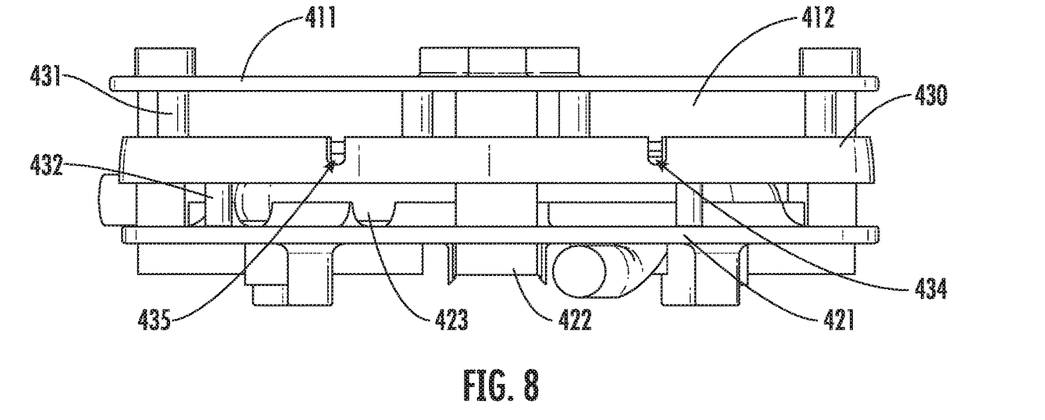
Figure 9:
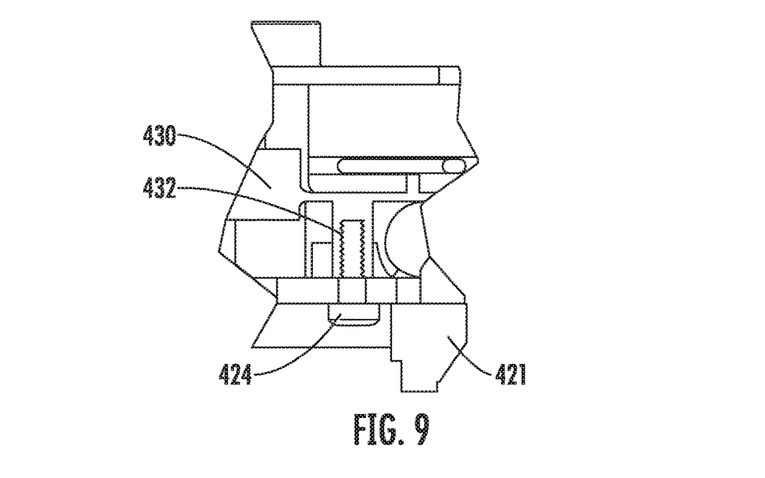
Figure 10:
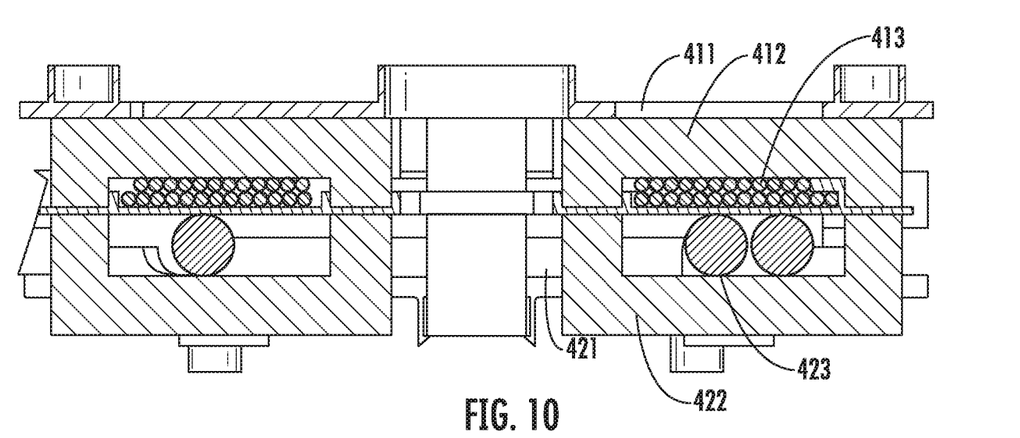
Figure 11:
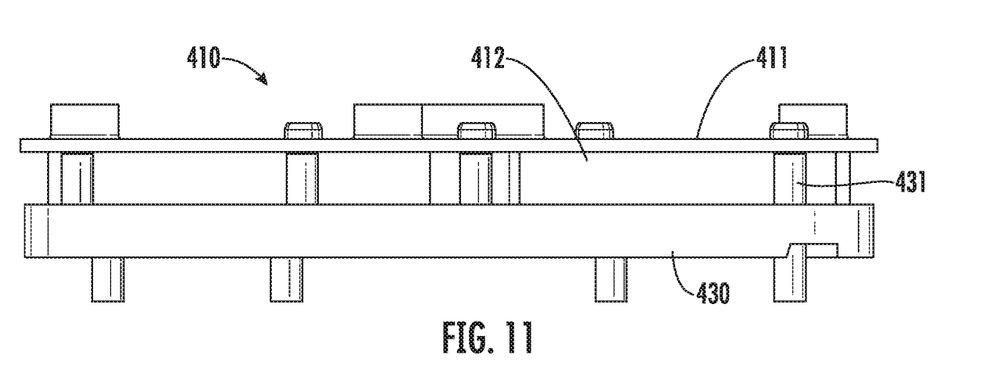

Referring to FIGS. 7 and 8, a first end of the secondary coil 423 may pass out of the assembly 400 on a first side of the third frame 421 and a second end of the secondary coil 423 may pass out of the assembly 400 in a second side of the third frame 421. Referring to FIG. 8, respective ends of the primary coil 413 may pass out of the assembly 400 via respective slots 434, 435 in the second frame 430. It will be appreciated, however, that other arrangements may be used for routing leads for the primary coil 413 and the secondary coil 423. As shown in FIG. 10, the primary coil 413 may include multiple (2 or more) planar layers and the number of layers can be expanded due the ability of the structure to be axially expanded. In some embodiments, the secondary coil 423 can have a number of turns ranging from a fractional number (e.g., 0.5) to several full turns. These features can enable the provision of a relatively large turns ratio (e.g., 40 or more) between the primary coil 413 and the secondary coil 423. High ratios can be made possible by increasing the magnetic coupling between the opposing magnetic material bodies, which may be ferrites or nano-crystalline magnetic material, to guide the magnetic flux. If ferrites or nano-crystalline materials are used and the primary is kept relatively compact by using multiple layers of turns and/or using small Litz wires, a desirable coupling between the windings can be achieved, resulting in an efficient design.

Figure 19:
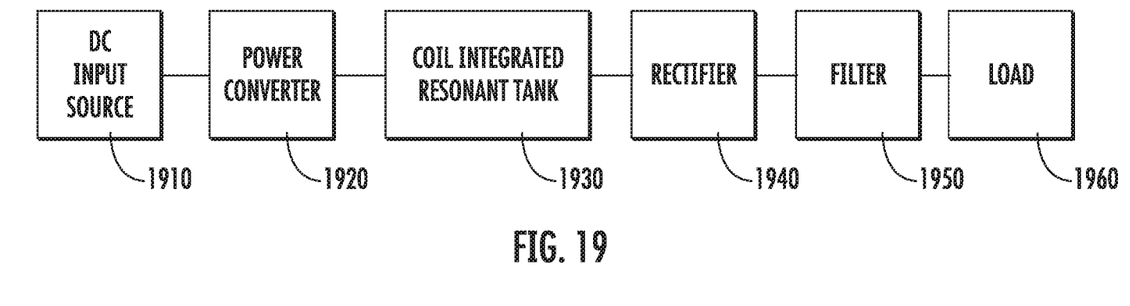
FIG. 19 is schematic diagram of a wireless power transfer system according to some embodiments.

According to some aspects, transformer assemblies along the lines described above with reference to FIGS. 1-18 may be used in wireless power transfer systems used in data center applications. Referring to FIG. 19, such a wireless power transfer system may include a DC input source 1910 that provides DC power to a power converter 1920 (e.g., an inverter) that drives a resonant tank circuit 1930 that includes a transformer along the lines discussed above. A rectifier circuit 1940 and a filter circuit 1940 are connected to this resonant tank circuit 1940 and are used to provide a DC output to a load 1960, e.g., a rack-mounted power supply that is used to provide power to servers and other rack-mounted equipment.

Figure 20:
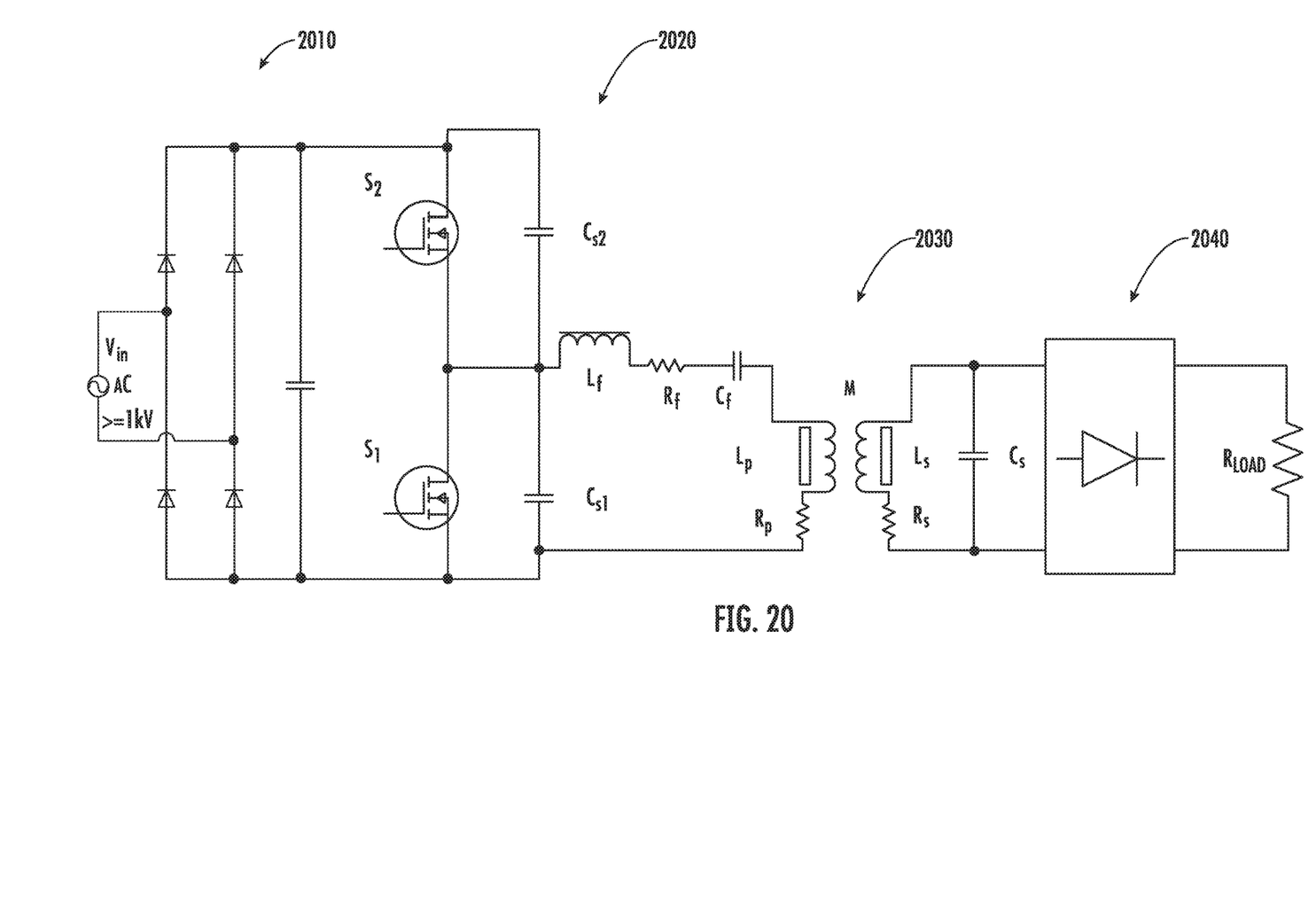
FIG. 20 is a schematic diagram of a wireless power transfer system according to further embodiments.

FIG. 20 is a schematic diagram illustrating an example of a wireless power transfer system that can use transformer assemblies along the lines described above. A full-wave rectifier circuit 2010 is connected to a medium voltage AC power source, e.g., a 4160 VAC distribution system in a data center. An inverter 2020 including first and second switching transistors S1, S2 drives a resonant tank circuit 2030 that includes a transformer M that may have a planar structure such as described above. A rectifier circuit 2040 may be coupled to the secondary winding of such a transformer and used to provide DC power to a load.

Figure 21:
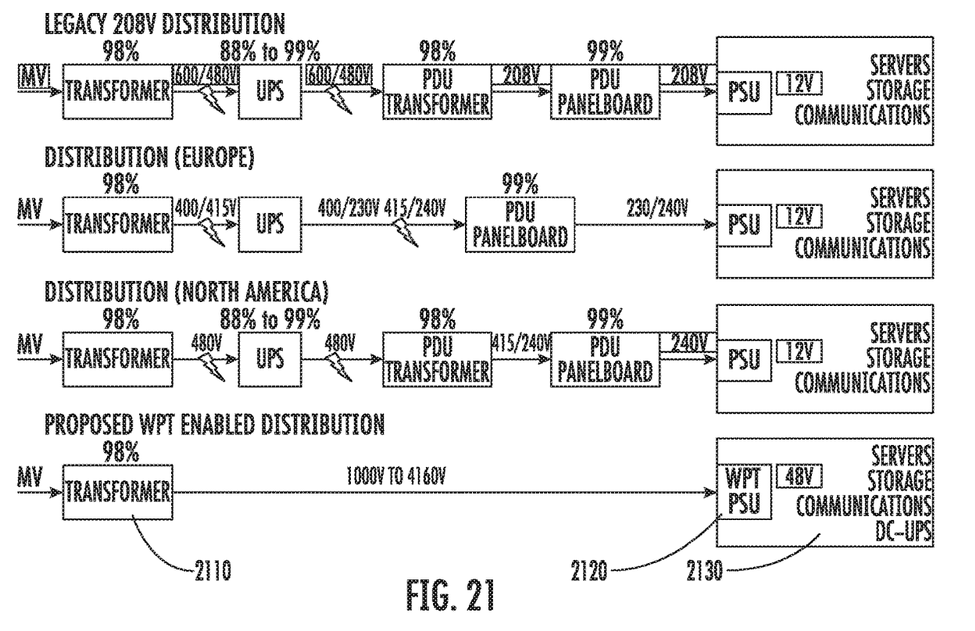
FIG. 21 is a diagram illustrating a data center power distribution system according to some embodiments in comparison to conventional arrangements.

FIG. 21 illustrates a potential application of such wireless power transfer systems in a data center environment. Medium voltage power at a relatively higher level (e.g., 35 kV) power is provided to a transformer 2110, which outputs a lower medium voltage (e.g., 1000 V to 4160 V) that may be the voltage used to distribute power to racks in a data center. At the racks, wireless power distribution apparatus 2120 (e.g., apparatus along the lines shown in FIGS. 19 and 20) is used to interface the medium voltage distribution to 48 VDC rack-mounted equipment 2130, such as servers, storage devices, routers, and DC UPSs. It will be appreciated that apparatus along the lines described above could also be used in a DC distribution system. For example, a wireless power transfer system for use with a DC distribution system may include an inverter (such as the inverter 2020 of FIG. 20) that could be connected to the DC distribution system either directly or via a DC-DC converter (e.g., omitting the input rectifier 2010 shown in FIG. 20 or replacing it with a DC-DC converter), and may utilize transformer structures along the lines described above.

Figure 22:
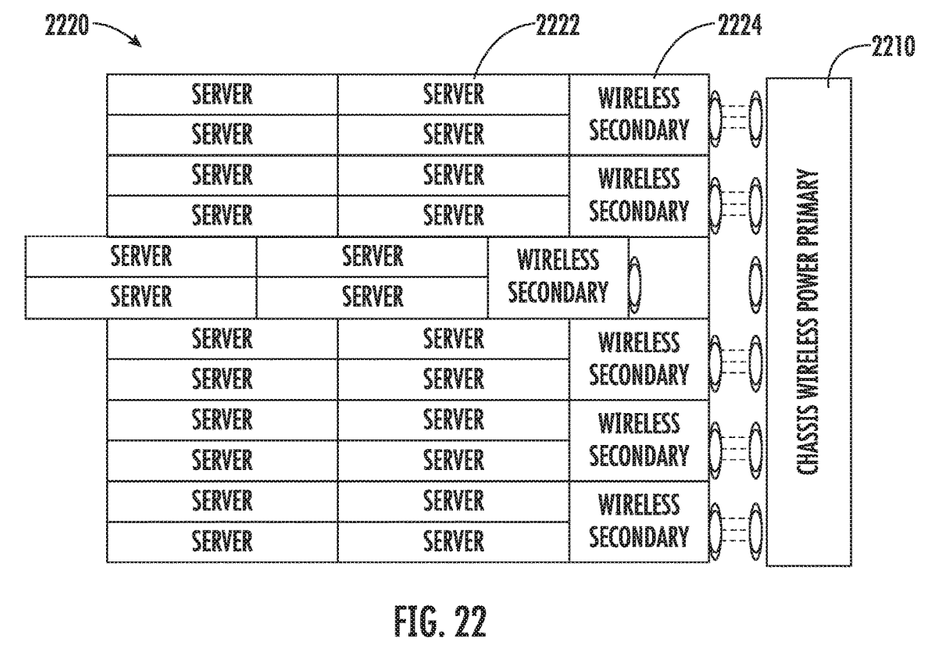
FIG. 22 is a diagram illustrating a wireless power transfer arrangement for a blade server application according to some embodiments.

FIG. 22 illustrate a wireless power transfer arrangement for a blade server application according to further embodiments. A primary wireless power transfer unit 2210, which may receive medium voltage (e.g., 4160 VAC) power, provides power to server units 2220 that include servers 2222 integrated with secondary wireless power transfer units 2224. The primary wireless power transfer unit 2210 may include one or more primary transformer components, such as transformer components similar to the primary side components 110 and 410 described above with reference to FIGS. 1 and 4, along with rectifiers, inverters and other components that are used to drive such transformer components along the lines discussed above with reference to FIGS. 19 and 20. The secondary wireless power transfer units 2224 may include corresponding transformer secondary components similar to the secondary side components 120 and 420 described above with reference to FIGS. 1 and 4, along with rectifier circuits, filter circuits and other wireless power transfer system components along the lines discussed above with reference to FIGS. 19 and 20.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. An apparatus comprising:
    a first coil;
    a second coil having a first side facing a first side of the first coil;
    a first radial array of magnetic material bodies disposed on a second side of the first coil;
    a second radial array of magnetic material bodies disposed on a second side of the second coil such that respective magnetic material bodies of the second radial array overlap respective magnetic material bodies of the first radial array; and
    a first circular frame that supports the first radial array and a second circular frame that supports the second radial array, wherein the first and second coils are disposed between the first and second circular frames.

2. The apparatus of claim 1, wherein the first coil, the second coil, the first radial array of magnetic material bodies and the second radial array of magnetic material bodies are coaxially aligned.

3. The apparatus of claim 2, wherein the magnetic material bodies of the first and second radial arrays comprise elongate magnetic material bars, each extending lengthwise from a center of the array towards a periphery of the array.

4. The apparatus of claim 1, further comprising a separator plate disposed between the first and second coils.

5. The apparatus of claim 4, further comprising first and second bobbins on respective first and second sides of the separator plate and wherein the first and second coils are wound around respective ones of the first and second bobbins.

6. An apparatus comprising:
    a first coil;
    a second coil having a first side facing a first side of the first coil;
    a first radial array of magnetic material bodies disposed on a second side of the first coil;
    a second radial array of magnetic material bodies disposed on a second side of the second coil such that respective magnetic material bodies of the second radial array overlap respective magnetic material bodies of the first radial array;
    a first frame that retains the first radial array of magnetic material bodies and the first coil; and
    a second frame that retains the second radial array of magnetic material bodies and the second coil and is attached to the first frame.

7. The apparatus of claim 6, wherein the first radial array of magnetic material bodies and the first coil are disposed on a first side of the first frame that faces the second frame, wherein the second coil is disposed on a first side of the second frame that faces the first frame; and wherein the second radial array of magnetic material bodies is disposed on a second side of the second frame.

8. The apparatus of claim 7, wherein the magnetic material bodies are C-shaped and wherein overlapping ones of the magnetic material bodies from respective ones of the first and second radial arrays substantially surround portions of the first and second coils.

9. The apparatus of claim 7:
    wherein the first radial array of magnetic material bodies comprises a first magnetic material body comprising a main body section disposed parallel to the first and second coils and first and second end sections that extend perpendicularly from the main body section; and
    wherein the second radial array of magnetic material bodies comprises a second magnetic material body comprising a main section disposed parallel to main body section of the first magnetic material body and first and second end sections that extend perpendicularly from the main body section of the first magnetic material body to towards opposing ones of the first and second end sections of the first magnetic material body such that the first and second magnetic material bodies substantially surround portions of the first and second coils.

10. The apparatus of claim 1:
wherein the first radial array of magnetic material bodies comprises a first magnetic material body comprising a main body section disposed parallel to the first and second coils and first and second end sections that extend perpendicularly from the main body section; and
wherein the second radial array of magnetic material bodies comprises a second magnetic material body comprising a main section disposed parallel to main body section of the first magnetic material body and first and second end sections that extend perpendicularly from the main body section of the first magnetic material body to towards opposing ones of the first and second end sections of the first magnetic material body such that the first and second magnetic material bodies substantially surround portions of the first and second coils.

11. The apparatus of claim 10, wherein the first radial array of magnetic material bodies is axisymmetric and wherein the second radial array of magnetic material bodies is axisymmetric.

12. The apparatus of claim 10, wherein at least one of the first and second coils comprises multiple layers of coils.

13. A wireless power transfer system including the apparatus of claim 10.

14. An apparatus comprising:
a first frame;
a first radial array of magnetic material bodies retained in the first frame;
a second frame;
a second radial array of magnetic material bodies retained in the second frame and coaxially aligned with the first radial array of magnetic material bodies in the first frame such that respective magnetic material bodies of the second radial array overlap respective magnetic material bodies of the first radial array,
a plate between the first and second frames;
a first coil between the first radial array and the plate; and
a second coil between the second radial array and the plate.

15. The apparatus of claim 14, wherein the magnetic material bodies of the first and second radial arrays comprise elongate magnetic material bars, each extending lengthwise from a center of the array towards a periphery of the array.

16. An apparatus comprising:
a first frame;
a second frame overlapping and attached to the first frame;
a first radial array of magnetic material bodies retained by the first frame and disposed between the first and second frames;
a first coil between the first radial array of magnetic material bodies and the second frame:
a second coil retained by the second frame on a first side thereof facing the first coil; and
a second radial array of magnetic material bodies retained on the second frame on a second side thereof and aligned with the first radial array of magnetic material bodies such that respective magnetic material bodies of the second radial array overlap respective magnetic material bodies of the first radial array.

17. The apparatus of claim 16, wherein the magnetic material bodies are C-shaped and wherein overlapping ones of the magnetic material bodies from respective ones of the first and second radial arrays substantially surround portions of the first and second coils.

18. The apparatus of claim 16, wherein the first radial array of magnetic material bodies is axisymmetric and wherein the second radial array of magnetic material bodies is axisymmetric.

19. The apparatus of claim 16, wherein the first coil comprises multiple layers of coils.

\* \* \* \* \*